United States Patent [19]

Wachowski et al.

[11] Patent Number: 4,685,712
[45] Date of Patent: Aug. 11, 1987

[54] SPRING-MOUNTED MOLDING FOR A VEHICLE

[75] Inventors: Raymond J. Wachowski, Sterling Heights; Francis A. Mulso, Lake Orion, both of Mich.

[73] Assignee: Chrysler Motors Corporation, Highland Park, Mich.

[21] Appl. No.: 911,545

[22] Filed: Sep. 25, 1986

[51] Int. Cl.$^4$ ............................................. B60R 19/42
[52] U.S. Cl. .................... 293/128; 293/135; 293/126; 267/160
[58] Field of Search ............ 293/102, 126, 128, 132, 293/135, 136; 362/61, 80, 82; 267/136, 139, 160

[56] References Cited

U.S. PATENT DOCUMENTS

| | | | |
|---|---|---|---|
| 2,062,328 | 12/1936 | Morrison | 293/55 |
| 2,093,734 | 9/1937 | Place | 24/253 |
| 2,174,252 | 9/1938 | Altmyer | 293/57 |
| 2,187,952 | 1/1940 | Rusche | 293/57 |
| 2,677,862 | 5/1954 | Flora | 24/73 |
| 2,691,545 | 10/1954 | Lyon | 293/62 |
| 2,820,270 | 1/1958 | Scott | 24/73 |
| 3,501,186 | 3/1970 | Wilcox et al. | 237/189.35 |
| 3,817,565 | 6/1974 | Geiger | 293/63 |
| 3,820,771 | 6/1974 | Kerr | 267/116 |
| 3,861,728 | 1/1975 | Haberle et al. | 293/126 |
| 3,937,508 | 2/1976 | Glance et al. | 293/63 |
| 4,059,301 | 11/1977 | Meyer | 293/52 |
| 4,629,232 | 12/1986 | Zimlich et al. | 293/128 |

FOREIGN PATENT DOCUMENTS

| | | | |
|---|---|---|---|
| 2844383 | 4/1980 | Fed. Rep. of Germany | 293/132 |
| 0089437 | 5/1983 | Japan | 293/102 |

Primary Examiner—Robert B. Reeves
Assistant Examiner—Russell D. Stormer
Attorney, Agent, or Firm—Edward A. Craig

[57] ABSTRACT

A spring mounted molding is provided for a vehicle on the body adjacent to a wrap-around end portion of the bumper. The molding and end portion of the bumper have mating cam surfaces. When the bumper moves toward the vehicle upon impact, the mating camming surfaces interact causing the molding to be deflected outwardly and the end portion of the bumper to slide therebeneath thus avoiding damage to the parts. Upon retraction of the bumper to its normal position, the spring mounting causes the molding to return to its normal position lying against the body of the vehicle. A spring urged extension is telescopically received in the end of the molding and defines the molding camming surface. The extension takes up any space between the molding and the end portion of the bumper.

3 Claims, 5 Drawing Figures

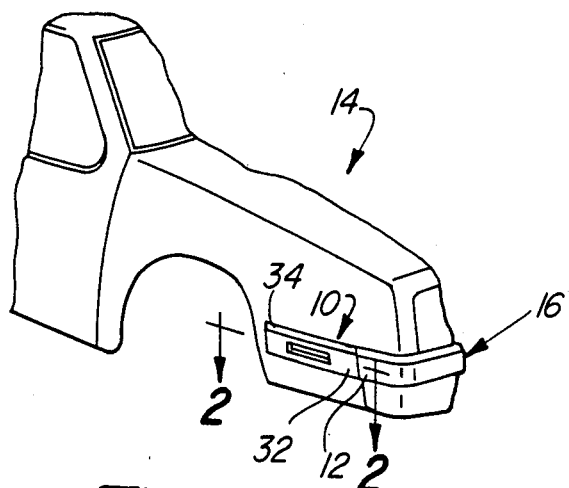
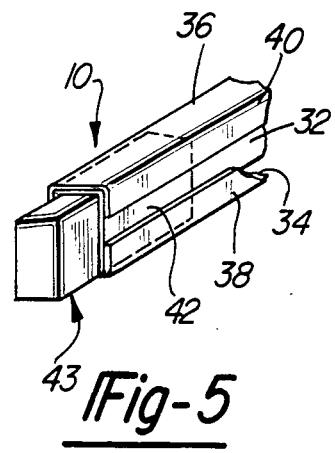
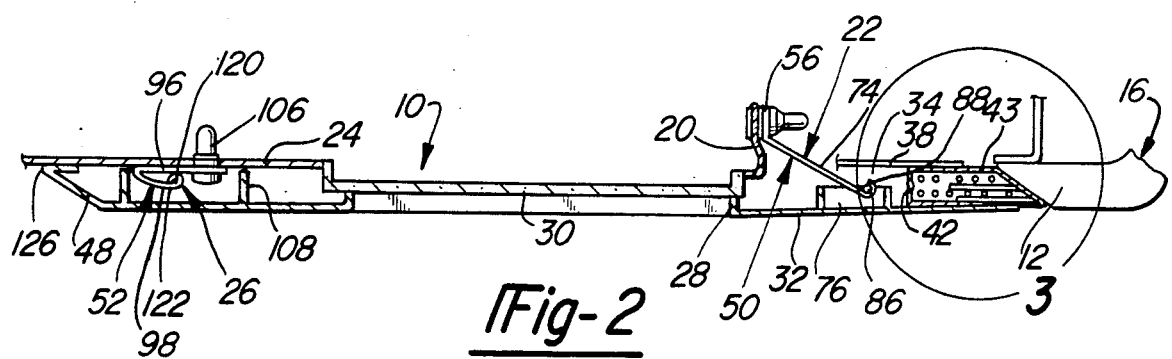
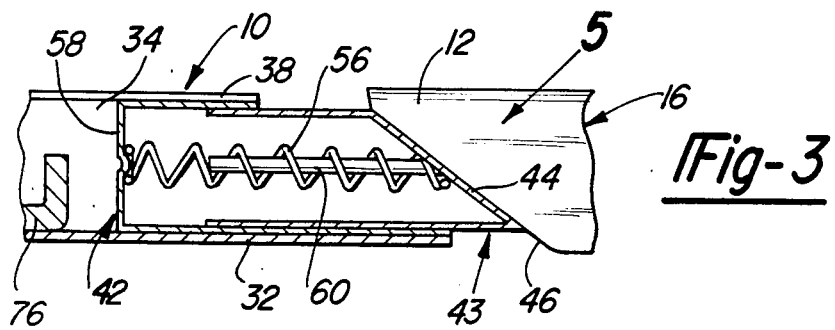
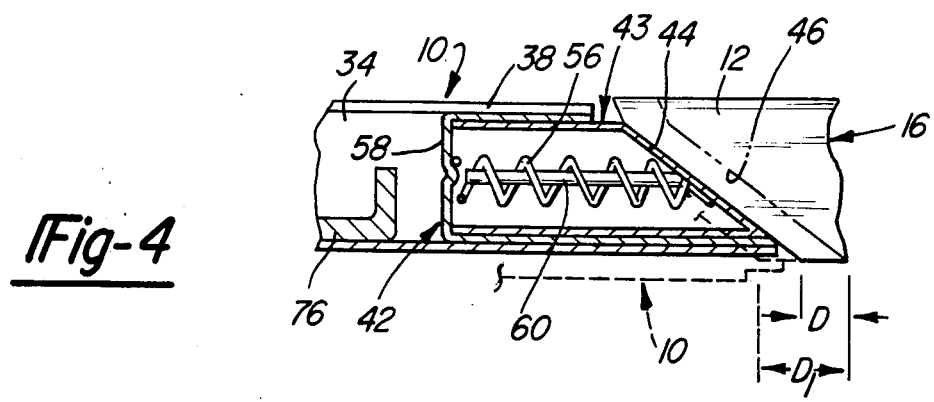

SPRING MOUNTED MOLDING FOR A VEHICLE

BACKGROUND OF THE INVENTION

1. Field of the Invention

This invention relates to a vehicle molding provided with spring mounting means to permit outward deflection of the molding upon bumper movement, the molding having a telescoping spring actuated end to permit limited reduction in the length of the molding prior to deflection.

2. Prior Art

Government regulations have mandated that front and rear bumpers of vehicles be so constructed and mounted as not to be damaged as a consequence of low speed impact with other vehicles or fixed structure. The prevailing method for accomplishing this has been to mount the bumper onto the vehicle by means of an energy absorbing device, such as a shock absorbing structure. When the bumper is impacted at low speeds, the energy absorbing device collapses, absorbing the energy of impact. This collapse takes with it the bumper which moves toward the vehicle. After being impacted, the energy absorbing devices bias the bumper back to its normal position.

One problem which has been encountered in connection with such structures is the maintenance of the integrity of moldings typically provided on the fenders of vehicles adjacent to and in-line with wrap-around end portions the bumpers which extend around the sides of the vehicles. As the bumper is moved toward the vehicle, the wrap-around end portions also, of course, move. These end portions will impact moldings which are mounted on the fenders closely adjacent thereto. If the moldings are rigid pieces, and rigidly mounted they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal position as a consequence of inherent resiliency. Examples of such moldings are illustrated in U.S. Pat. Nos. 3,937,508 and 4,059,301.

It has been desired to use a molding fabricated of rigid material. Such a molding will not, of course, flex upon being impacted by an end portion of a bumper. It is necessary that such rigid molding not be damaged by the bumper upon impact. In accordance with these needs, spring mounting means, as disclosed in U.S. patent application Ser. No. 06/776,077, filed Sept. 3, 1985 now U.S. Pat. No. 4,629,232, are provided to permit outward deflection of the molding upon bumper movement, with the end portions of the bumper sliding beneath the molding thereby avoiding damage to the molding.

However, this construction has one disadvantage. There is frequently a small amount of permanent bumper set after impact. Therefore, the molding has to be offset from the bumper a short distance so that it can return to its initial position after the bumper retracts to a position which is closer to the molding than the initial position of the bumper because of the small amount of permanent bumper set. This requires a short empty space or gap to be provided between the adjacent ends of the molding and bumper. This gap is considered to be aesthetically objectionable.

In accordance with the present invention, the molding is provided with a spring urged, telescoping extension adjacent the bumper. This permits limited reduction in molding length upon impact of the bumper with the molding prior to deflection of the molding. Any permanent set of the bumper is taken up by the telescoping extension. This permits the molding to be mounted closely adjacent to the bumper end with no gap between these elements.

SUMMARY OF THE INVENTION

A spring mounted molding for a vehicle having a body and a bumper mounted on one of the forward and rearward ends thereof is provided. Energy absorbing structure is provided to mount the bumper to the vehicle. The energy absorbing structure biases the bumper to a normal position but permits movement of the bumper toward the vehicle upon impact. The bumper has an end portion extending around a side of the vehicle body. The spring mounted molding comprises a relatively rigid element having an underside and an exterior side. Spring means are provided on the underside of the molding. The spring means are connected between the molding and vehicle with the molding lying on the exterior of the vehicle body in alignment with, and adjacent to, the bumper end portion. The spring means biases the molding closely adjacent to the vehicle body. The molding has a camming surface adjacent to the bumper end portion. The bumper end portion has a mating camming surface adapted to contact the molding camming surface and move to the underside of the molding when the bumper is moved towards the vehicle upon impact, with the molding moving away from the vehicle body against the action of the spring means. The spring means is effective to bias the molding back to its original position upon retraction of the bumper end portion.

The camming surface of the molding is formed on a spring urged telescoping extension of the molding. Prior to the bumper camming surface moving to the underside of the molding, the bumper causes the extension to telescope into the molding to shorten the length of the molding.

DESCRIPTION OF THE DRAWINGS

FIG. 1 is a view in perspective of a portion of a car with a spring mounted molding forming one embodiment of the present invention illustratively mounted on the right-hand front fender;

FIG. 2 is a sectional view taken substantially along the line 2—2 of FIG. 1 looking in the direction of the arrows;

FIG. 3 is an enlarged view of that portion encircled in FIG. 2;

FIG. 4 is a view similar to FIG. 3 illustrating the molding and bumper after bumper movement; and FIG. 5 is a perspective view illustrating the molding end which is pointed at by the arrow in FIG. 3 with the bumper removed for the purposes of clarity.

DESCRIPTION OF THE PREFERRED EMBODIMENT

Referring to FIG. 1, it will be noted that the spring mounted vehicle molding 10 in accordance with the present invention is mounted on the side of the front right fender of an automobile 14. A similar molding is mounted on the rear right fender. Mirror image moldings are mounted on the opposite or left-hand side of the automobile 14. It will be noted that the molding 10 is mounted in line with and adjacent to the end portion 12 of front bumper element 16. This portion extends around the side of the vehicle.

The bumper elements are mounted on the automobile 14 for movement relative to the automobile body upon impact. Energy absorbing devices, such as shock absorbers, are provided to mount and bias the bumper elements in a normal position such, for example, as illustrated in the previously mentioned U.S. Pat. Nos. 3,937,508 and 4,059,301. The specific type of energy absorbing device is not germane to the present invention, the present invention functioning with various style of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. However, in some cases of greater impact, the bumper structure may have a small amount of permanent set and consequently not return all of the way to its original position.

The spring mounted molding of the present invention is designed to accommodate limited bumper motion without damage to the molding. As shown in FIG. 2, the portion of the molding 10 adjacent to the front bumper element end portion 12 is mounted to body structure 20 by means of a spring mechanism 22. The portion of the molding 10 which is remote from the bumper end portion 12 is mounted to automobile body structure 24 by means of spring mechanism 26.

The molding 10 is a relatively rigid trim piece designed to stylistically merge with the front bumper element 16. The molding 10 includes a rectangular opening 28 which surrounds a lens 30, usually amber in color, which is mounted on the automobile body structure. A lamp is normally provided behind the lens to illuminate the lens when the vehicle lights are energized. Such lamps are commonly referred to as "fender marker lamps" and the molding 10 as a "marker surround".

The molding 10 may be fabricated as, for example, a stamped brass element. The molding 10 is elongated in the direction of the length of the automobile 14. It includes an exterior side comprising an outer wall portion 32 from the sides of which depend side wall portions 34, 36 which space the outer wall portion 32 from the automobile body structure. The side wall portions 34, 36 terminate on inwardly turned flange portions 38, 40, all of which may be seen in FIG. 5.

The end of the molding 10 adjacent to the bumper end portion 12 is provided with a cup-shaped member 42 which is staked securely in place. The end of the molding 10 remote from the bumper element 16 is closed by means of portion 48. The member 42 conforms to the shape of the molding 10. The member 42 telescopically receives a second cup-shaped extension member 43 which is provided with a wall portion 44 adjacent to the bumper end portion 12 which extends at an angle outwardly and towards the bumper end portion 12. The bumper end portion 12 has a similar wall surface 46 which is reversely angled. In operation, the faces 44, 46 function as mating camming surfaces at such times as bumper element 16 is moved toward the molding 10 upon impact of the bumper. The camming action which results causes the molding 10 to be pivoted out of the way of the bumper end portion 12 as will be later described. As will be noted in FIGS. 2 and 3, no space is provided between the wall portions 44, 46.

A coil spring 56 is provided in compression within member 43. The spring 56 extends between end wall 58 of member 42 and wall 44 of member 43 and urges these members apart. The member 42, being fixed in place, can't move, thus permitting member 43 to telescope therein. A guide bar 60 is provided within members 42, 43 and is secured at one end to the wall 44 as by welding.

The spring mechanisms 22 and 26 will next be described. These mechanisms are shown in FIG. 2. Each spring mechanism includes a spring clip 50, 52 which may be fabricated of spring steel. Each spring clip includes spring arm structure which may be characterized as flat spring means.

The spring mechanism 22 includes the spring clip 50 which is secured to fixed body structure 20 by means of staking element structure 66 which passes through mounting portion 56. The spring clip 50 has a spring arm 74 which extends away from mounting portion 56 at an angle toward the molding 10. The spring arm 74 extends into the center of a rectangular carriage 76 which is slidingly received within the molding 10. The carriage 76 has an open top and bottom.

A pin 86 extends between the side walls of the carriage and is molded thereinto. The pin 86 is located substantially centrally of the carriage and receives bentover portion 88 of the spring arm 74 to thereby secure the spring arm to the carriage.

As will be appreciated outward flexing of spring arm 74 as a result of movement of the molding 10 caused by contact with bumper element 16 as it is moved to the left, as shown in FIG. 4, will result in deflection of spring arm 74 and movement of the carriage 76 away from the bumper.

The other spring mechanism 26 is constructed similarly to the spring structure 22. The spring clip 52 is constructed of two spring arms 96, 98 having a U-shape configuration. Spring clip 52 is secured in place by means of staking element structure 106. A rectangular carriage 108 having an open top and bottom is provided for connection of spring clip 52 to the molding 10. The carriage 108 is fixed in place and is not movable as is the carriage 76. This is accomplished by means of staking. A pin 120 is molded into the carriage side walls and receives turned-over portion 122 of spring arm 98.

In operation, the molding 10 lies against the automobile body structure in its normal at-rest position as shown in FIG. 2. When bumper element 16 is moved as viewed in the figures, contact with end portion 12 will first cause member 43 to telescope into member 42 as shown in FIG. 4 thus shortening the length of molding 10. Molding 10 will then deflect outwardly thereby permitting passage of the bumper end portion 12 therebeneath without damage to the molding or damage to the automobile body. As the molding 10 is deflected, the portion nearest the bumper end portion 12 will swing in a fairly wide arc. Along with this spring arm movement, the carriage 76 slides in molding 10. Spring mechanism 26 serves to permit lesser pivoting of the end of molding 10 remote from the bumper element 16. Both spring arms 96, 98 deflect. The remote end point 126 of the molding 10 acts as a pivot center. The pin 120 moves in what is essentially a straight line and thus it is not required that the carriage 108 be movable. It is not desired that this carriage be movable otherwise the molding 10 would slide along the surface of the body structure. When the bumper element 16 is retracted to its normal position, molding 10 is also returned to the normal position shown in FIG. 2 as a result of the spring bias. However, if the bumper element 16 does not go all the way back to its original position, the member 43 will also not return to its original position. This small amount of difference in position will not, however, appreciably affect the appearance of the molding.

We claim:

1. In a spring mounted molding for a vehicle having a body and a bumper mounted on one of the forward and rearward ends thereof, energy absorbing structure mounting the bumper to the vehicle, said energy absorbing structure biasing the bumper to a normal position but permitting movement of the bumper towards the vehicle upon impact, said bumper having an end portion extending around a side of the vehicle body, said spring mounted molding comprising a relatively rigid element having an underside and an exterior side, spring means on the underside of the molding, said spring means being connected between the molding and the vehicle with the molding lying on the exterior of the vehicle body in alignment with, and adjacent to, said bumper end portion, said spring means biasing the molding closely adjacent to the vehicle body, the molding having a camming surface adjacent to the bumper end portion, the bumper end portion having a mating camming surface adapted to contact the molding camming surface and move to the underside of the molding when the bumper is moved toward the vehicle upon impact, with said molding moving away from the vehicle body against the action of said spring means, said spring means being effective to bias the molding back to its original position upon retraction of the bumper end portion; said spring means being fixedly anchored to one of the vehicles and molding and slidably anchored to the other of the vehicle and molding, the improvement comprising a spring urged extension member telescopically mounted in the molding adjacent to the bumper end portion, said member including the molding camming surface which is normally urged into contact with the mating bumper camming surface.

2. A spring mounted molding as defined in claim 1, further characterized in that the extension member is cup-shaped, a wall within the molding, and a coil spring extending between said wall and cup-shaped extension in compression.

3. A spring mounted molding as defined in claim 2, further characterized in the provision of guide bar means secured in the cup-shaped extension and extending through the interior of the coil spring.

* * * * *